Patented Sept. 26, 1950

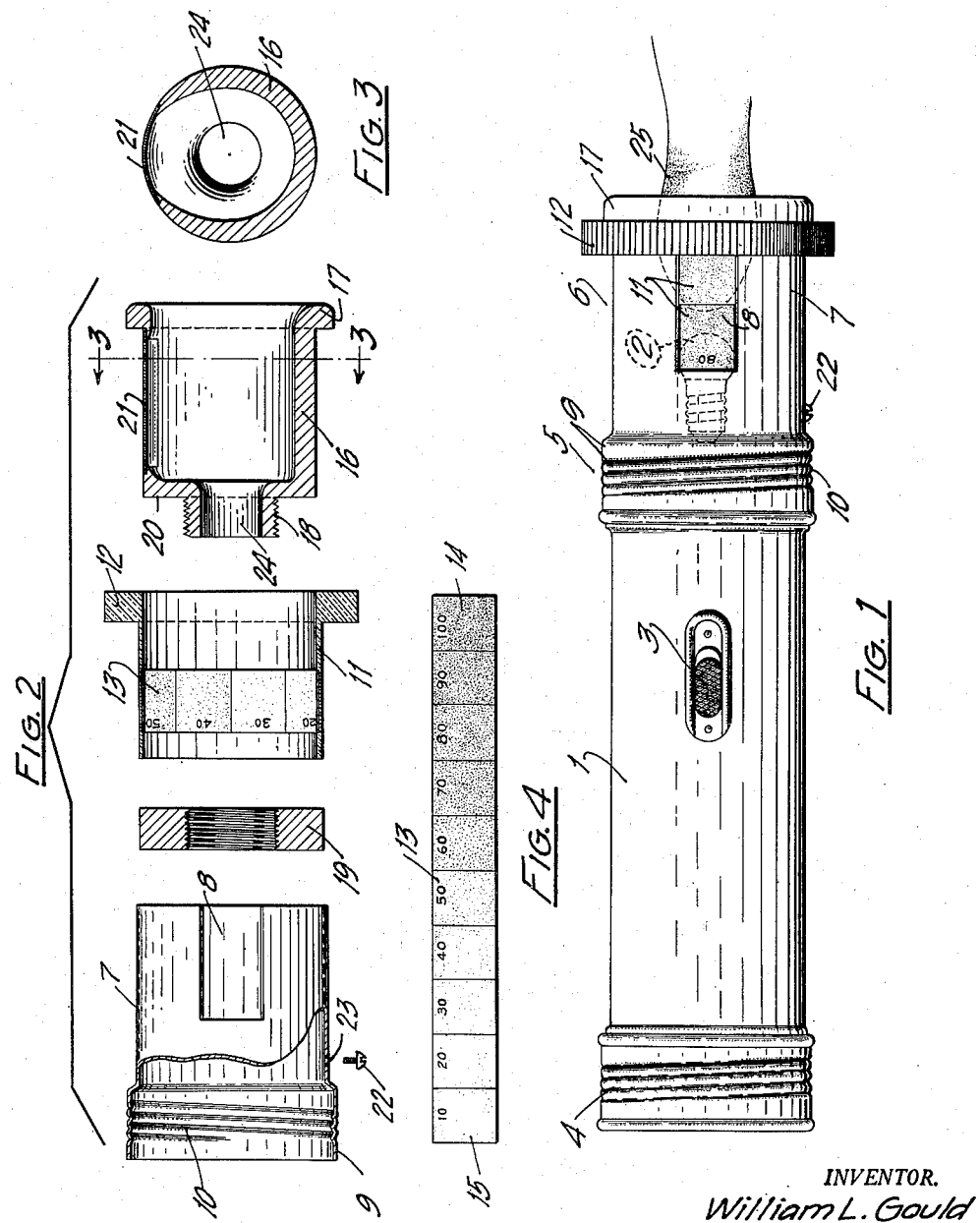

2,523,758

UNITED STATES PATENT OFFICE 2,523,758

HEMOGLOBINOMETER

William L. Gould, Albany, N. Y.

Application December 30, 1944, Serial No. 570,735

4 Claims. (Cl. 88—14)

My invention relates to improvements in haemoglobinometers for measuring the haemoglobin in the blood.

The method most commonly employed in determining the haemoglobin in the blood involves, the taking of an actual sample of the blood and the matching of this sample with a predetermined color scale. Usually the comparison is made by transillumination of the blood sample and a translucent chart or scale of graduated color intensity. In either case an actual sample of the blood must be drawn from the body and while this is not too painful an operation there is, nevertheless some pain connected with making the puncture through which the sample is obtained.

The principal object of my invention is to provide an improved means for measuring the haemoglobin in the blood of an individual without the necessity of withdrawing an actual specimen of the blood. Another object is to provide a simple, inexpensive apparatus which will function as a haemoglobinometer. A further object is to provide a small, inexpensive attachment which is adapted for attachment to the body of an ordinary flashlight to form a haemoglobinometer for testing blood by my method.

With these objects in view my invention includes the novel method of measuring the haemoglobin hereinafter described, and the apparatus which may be used in performing my method which is described below and illustrated in the accompanying drawing in which—

Fig. 1 is an outside plan view of my complete haemoglobinometer;

Fig. 2 is an exploded plan view, with certain portions broken away and certain portions in section, of that portion of my device which is adapted for attachment to an ordinary flashlight to form a haemoglobinometer.

Fig. 3 is a section of Fig. 2 in the plane 3—3; and

Fig. 4 is a developed view of the color scale.

The method which I employ to determine the haemoglobin in the blood of an individual is extremely simple and consists merely in comparing, by transillumination, the color of a convenient portion of the human body, such for example, as a finger, with the colors of a calibrated chart or scale. In other words, I transmit light from a given source simultaneously through a translucent color scale and through a portion of the body of the individual whose blood is to be measured, and manipulate the color scale until it appears, by the light transmitted therethrough, to be identical in color with that of the light transmitted through the finger.

Referring to the drawings:

I represents the body or casing of an ordinary flashlight which is understood to contain the usual batteries and a lamp bulb 2 which may be lighted by pushing forward on the switch 3. Such flashlights are so well known to practically everyone that a detailed illustration and description thereof seems entirely unnecessary. However, the casing is provided with the usual screw cap 4 at one end which may be removed to remove and replace the batteries, and is also threaded at the opposite end 5 ordinarily to receive that portion of the flashlight which contains the reflector and the lens. By removing the reflector and lens-carrying portion of the flashlight and replacing it with the part shown generally at 6 in Fig. 1, and which forms substantially an extension of the casing, a very practical haemoglobinometer may be formed.

Referring now more particularly to Figs. 2, 3 and 4, my haemoglobinometer attachment for a flashlight comprises a short metal tube 7 having a rectangular cut-out portion or notch 8 extending in an axial direction in one side thereof. The tube 7 is preferably enlarged in diameter at one end as shown at 9 and, in any event, is provided with a female thread 10 adapted to cooperate with the thread on the flashlight casing 1 which ordinarily cooperates with the reflector and lens-containing portion of the flashlight.

The tube 11 is adapted to fit within the tube 7 and is provided with the peripherally knurled flange 12 by means of which it may be rotated within the tube 7. The cylindrical body portion of the tube 11 is formed of transparent material, such for example as "Lucite," and the walls thereof are preferably thin, as shown. The interior side wall of the tube 11 is provided with a circumferential recess, and cemented or otherwise secured within the recess is the translucent color scale 13, here shown as divided into ten sections numbered by tens from 10 to 100. The color scale may be of paper and the sections thereon are colored and calibrated to indicate the percentages of haemoglobin in the blood. Thus the section 14 would indicate a haemoglobin content of 100% while the section 15 would indicate a content of only 10%.

The cylindrical tube 16 is adapted to fit within the tube 11. At the outer end, the tube 16, which is shown as turned 90° from its position when assembled with tube 7, is provided with an outstanding peripheral flange 17 with which the flange 12 on the tube 11 is adapted to run in contact when the parts are assembled. At the inner end, the cylinder 16 is reduced in diameter and the exterior thereof is threaded, as shown at 18, to receive the nut 19. Thus, in assembling the parts, the tube 16 is inserted in the tube 11 and the nut 19 is threaded on to the reduced portion of the cylinder 16 so that these parts are held in assembled relation; it being understood that, after the nut 19 is screwed tightly against the end 20 of the tube 16, there is a little clearance between the nut and the end of the tube 11 so that the tube 11 can rotate with respect to the tube 16 after these parts have been assembled.

The tube 16 is preferably of opaque material and may be of wood or plastic, but it is provided with a transparent portion 21, of "Lucite" or the like, forming a sort of window therein adapted to register with the slot 8 in tube 7.

The tubes 11 and 16 assembled as described above are secured within the tube 7 by means of the screw 22 which passes through an opening 23 in the tube 7 and sets against the nut 19. Thus, the tube 16 and the nut 19 are held stationary within the tube while the tube 11 is freely rotatable about the tube 16 and within the tube 7.

When the device is assembled as shown in Fig. 1 the light bulb 2 of the flashlight projects through the passage 24 in the tube 16 and thus, when lighted, illuminates the interior of the tube 16.

To use the device the individual whose haemoglobin is to be measured inserts the end of his finger 25 in the tube 16 and presses the ball of the finger firmly against the window 21. The color scale is then manipulated by turning the knurled flange 12 until the color of the light transmitted from the bulb 2 through the particular section of the color scale which is adjacent the window 21 appears of the same color as the light transmitted through the blood in the individual's finger, whereupon the percentage of haemoglobin in the blood may be read from the color scale.

While I have described my invention in its preferred embodiment it is to be understood that the words which I have used are words of description rather than of limitation and that changes within the purview of the appended claims may be made without departing from the true scope and spirit of my invention.

What I claim is:

1. In a haemoglobinometer, the combination with a flashlight including a casing and a light bulb, of means forming a tubular extension of said casing around said light bulb and having an opening in the side thereof adjacent said bulb, a tubular element rotatably mounted in said extension and provided with a translucent color scale thereon having circumferentially disposed sections indicating, when transilluminated, different proportions of haemoglobin in human blood and adapted to be brought into registration with a portion of said opening; the balance of said opening being adapted to be covered by a finger inserted in said extension; whereby, said finger may be simultaneously transilluminated with the section of said scale in registration with said opening for color comparison.

2. A haemoglobinometer attachment for a flashlight comprising a tubular element adapted to fit over the end of a flashlight in place of the lens and reflector-containing portion of said flashlight and laterally to enclose the light bulb of said flashlight; said element having an opening in the side thereof adapted to be positioned adjacent said bulb and to be partially closed by inserting a finger in said tubular element, and a rotatable color scale forming part of said tubular element and comprising translucent sections indicating various proportions of haemoglobin in human blood each adapted to be moved into registration with and to close that portion of said opening not closed by said fingers; whereby said finger and a section of said color scale may be simultaneously transilluminated by light from said bulb for color comparison.

3. A haemoglobinometer attachment for a flashlight comprising a first tubular element adapted to fit over the end of a flashlight casing in place of the lens and reflector-containing portion of said flashlight and laterally to enclose the light bulb thereof, and having an opening in the side thereof, a second tubular element having a translucent portion in the side thereof secured within said first element with said translucent portion in registration with the opening in said first element, and a cylindrical, translucent color scale calibrated to indicate, when transilluminated by light from said bulb, the haemoglobin in human blood rotatably mounted between said tubular elements and having a circumferential portion thereof in registration with part only of the translucent portion of said second element; whereby a finger inserted within said tubular elements and pressed against the translucent portion of said second element adjacent said color scale may be simultaneously transilluminated with said color scale for comparison therewith.

4. A haemoglobinometer attachment for a flashlight having a light bulb in one end thereof; said attachment comprising two, relatively rotatable, telescopically-interfitted, tubular elements adapted to have a finger inserted therein, and adapted to fit over that end of said flashlight having the light bulb therein; one of said elements being translucent and provided with a cylindrical, translucent color scale calibrated to indicate, when transilluminated by light from said bulb, the haemoglobin in human blood, and the other of said elements having an opening in the side thereof in registration with a portion of said scale; whereby a finger inserted within said tubular elements in registration with said opening in said other element adjacent said color scale may be simultaneously transilluminated with selected portions of said scale by effecting relative rotation of said elements until the color of said finger, as transilluminated, substantially matches a portion of said scale.

WILLIAM L. GOULD.

REFERENCES CITED

The following references are of record in the file of this patent:

UNITED STATES PATENTS

| Number | Name | Date |
|---|---|---|
| 663,536 | Fox et al. | Dec. 11, 1900 |
| 1,629,609 | Bader | May 24, 1927 |
| 1,826,849 | Walter | Oct. 13, 1931 |
| 2,358,992 | Millikan | Sept. 26, 1944 |

FOREIGN PATENTS

| Number | Country | Date |
|---|---|---|
| 515,310 | Great Britain | Dec. 1, 1939 |